US012649956B2

(12) United States Patent (10) Patent No.: US 12,649,956 B2

Ferrari et al. (45) Date of Patent: Jun. 9, 2026

(54) DEVICE FOR HEATING STEEL PRODUCTS

(71) Applicants: DANIELI & C. OFFICINE MECCANICHE S.P.A., Buttrio (IT); DANIELI CENTRO COMBUSTION S.P.A., Cinisello Balsamo (IT)

(72) Inventors: Corrado Ferrari, Genoa (IT); Alessandro Venanzini, Genoa (IT); Elisa Salamone, Genoa (IT)

(73) Assignees: DANIELI & C. OFFICINE MECCANICHE S.P.A., Buttrio (IT); DANIELI CENTRO COMBUSTION S.P.A., Cinisello Balsamo (IT)

( * ) Notice: Subject to any disclaimer, the term of this patent is extended or adjusted under 35 U.S.C. 154(b) by 363 days.

(21) Appl. No.: 18/270,906

(22) PCT Filed: Dec. 28, 2021

(86) PCT No.: PCT/IT2021/050436

§ 371 (c)(1),
(2) Date: Jul. 5, 2023

(87) PCT Pub. No.: WO2022/149178

PCT Pub. Date: Jul. 14, 2022

(65) Prior Publication Data

US 2024/0068062 A1     Feb. 29, 2024

(30) Foreign Application Priority Data

Jan. 5, 2021     (IT) ........................ 102021000000086

(51) Int. Cl.
*C21D 9/00*          (2006.01)
*B65G 25/02*        (2006.01)
(Continued)

(52) U.S. Cl.
CPC ........... *C21D 9/0012* (2013.01); *B65G 25/02* (2013.01); *C21D 9/0056* (2013.01); (Continued)

(58) Field of Classification Search
CPC .. C21D 9/0012; C21D 9/0056; C21D 9/0081; B65G 25/02; B65G 2812/09; (Continued)

(56) References Cited

U.S. PATENT DOCUMENTS 4,420,145 A * 12/1983 Martini ................... F27B 9/207 266/252
10,571,134 B2 * 2/2020 Weaver ................ F24C 15/023
(Continued)

FOREIGN PATENT DOCUMENTS

CN          110398151 A * 11/2019      ................ F27B 9/39
DE          33 39 585 C1     11/1987
(Continued)

OTHER PUBLICATIONS

Metalcor_N06045_data_sheet.pdf (Year: 2025).*
(Continued)

*Primary Examiner* — Steven S Anderson, II
*Assistant Examiner* — Kurt J Wolford
(74) *Attorney, Agent, or Firm* — RANKIN, HILL & CLARK LLP

(57)          ABSTRACT

An apparatus for heating steel products, in particular billets, includes a heating chamber, a plane of advance defined inside the heating chamber and feed and extraction components for the steel products.

9 Claims, 6 Drawing Sheets

(51) Int. Cl.

| | |
|---|---|
| *C22C 19/05* | (2006.01) |
| *F27B 9/00* | (2006.01) |
| *F27B 9/20* | (2006.01) |
| *F27B 9/24* | (2006.01) |
| *F27B 9/38* | (2006.01) |
| *F27B 9/39* | (2006.01) |
| *F27D 3/00* | (2006.01) |
| *F27D 3/02* | (2006.01) |

(52) U.S. Cl.
CPC ............ *C21D 9/0081* (2013.01); *C22C 19/05* (2013.01); *C22C 19/053* (2013.01); *C22C 19/055* (2013.01); *F27B 9/00* (2013.01); *F27B 9/201* (2013.01); *F27B 9/2407* (2013.01); *F27B 9/38* (2013.01); *F27B 9/39* (2013.01); *F27D 3/026* (2013.01); *B65G 2812/09* (2013.01); *B65G 2814/03* (2013.01); *F27B 2009/382* (2013.01); *F27B 2009/384* (2013.01); *F27D 2003/0048* (2013.01)

(58) Field of Classification Search
CPC ... B65G 2814/03; C22C 19/05; C22C 19/053; C22C 19/055; F27B 9/00; F27B 9/201; F27B 9/2407; F27B 9/38; F27B 9/39; F27B 2009/382; F27B 2009/384; F27D 3/026; F27D 2003/0048

See application file for complete search history.

(56) References Cited

U.S. PATENT DOCUMENTS

| | | | | |
|---|---|---|---|---|
| 2010/0273121 A1* | 10/2010 | Gleason | .................... | F27D 7/04 |
| | | | | 432/48 |
| 2013/0323113 A1* | 12/2013 | Hattendorf | .............. | C22C 19/05 |
| | | | | 420/443 |
| 2015/0050611 A1* | 2/2015 | Nakano | .................... | C21D 9/00 |
| | | | | 432/122 |

FOREIGN PATENT DOCUMENTS

| | | | | | | |
|---|---|---|---|---|---|---|
| DE | 4008313 | A1 * | 9/1991 | .............. | F27B 9/201 |
| DE | 102010017530 | A1 * | 12/2011 | ....... | H01L 21/67706 |
| EP | 0 183 955 | A2 | 6/1986 | | |
| EP | 0 752 481 | | 1/1997 | | |
| EP | 2 678 458 | A1 | 1/2014 | | |
| GB | 1 473 645 | A | 5/1977 | | |
| WO | WO-2007138195 | A1 * | 12/2007 | .............. | F27D 17/10 |
| WO | 2012/052960 | | 4/2012 | | |

OTHER PUBLICATIONS

CN-110398151-A translation (Year: 2025).*
DE-102010017530-A1 translation (Year: 2025).*
DE-4008313-A1 translation (Year: 2025).*
WO-2007138195-A1 translation (Year: 2025).*
International Preliminary Report on Patentability issued in PCT/IT2021/050436 dated Mar. 3, 2023.
International Search Report issued in PCT/IT2021/050436 dated Apr. 8, 2022.

* cited by examiner

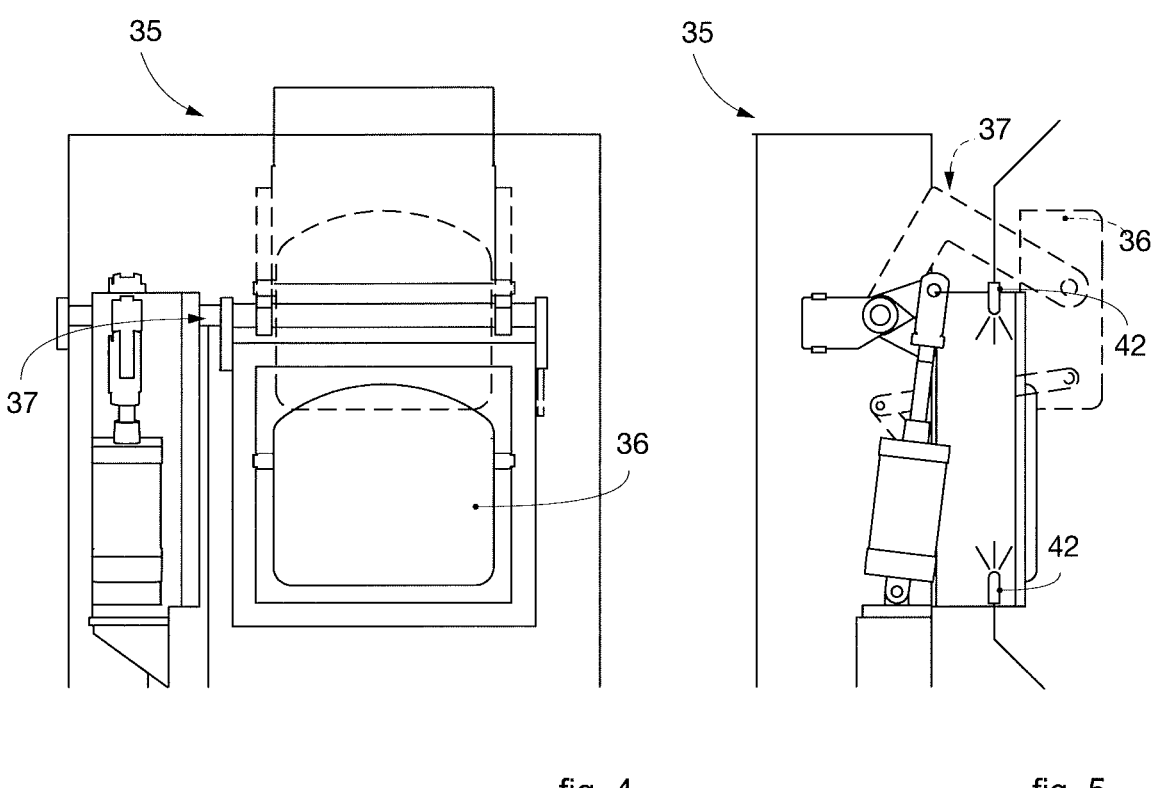
fig. 4                              fig. 5
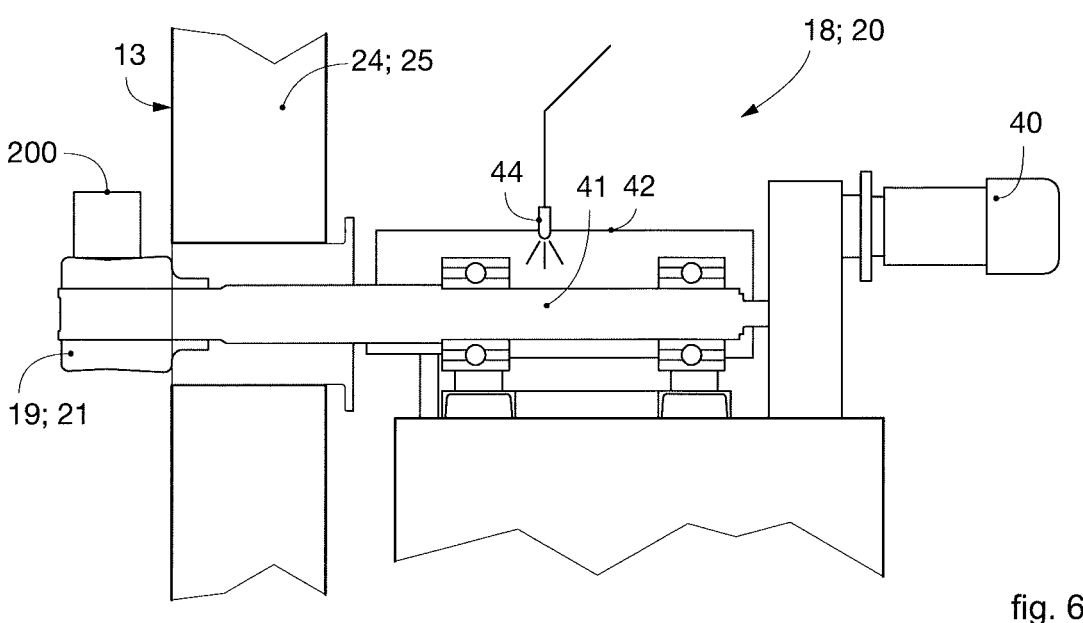
fig. 6

DEVICE FOR HEATING STEEL PRODUCTS

FIELD OF THE INVENTION

Embodiments described here concern an apparatus for heating steel products, such as metallic or non-metallic products, for example made of an alloy.

The invention in particular concerns semi-finished steel products, such as billets or blooms, to be subsequently sent for rolling.

BACKGROUND OF THE INVENTION

Furnaces are known for heating steel products such as blooms or billets, used to raise the temperature of semi-finished metal products up to a value suitable for rolling.

Traditional heating furnaces are provided with water-based cooling systems for the structural elements subjected to greater heating stresses, and generally have a heating chamber in which the steel products are moved continuously or intermittently between an inlet and an outlet, in correspondence with which there are respective roller ways for inserting and extracting the products, together with possible loading and unloading machines.

The heating chamber has a plane of advance which, depending on the case, can be made in different ways. In furnaces with mobile longitudinal members, better known as walking beam furnaces, the plane of advance is defined by the alternation of fixed beams and mobile beams disposed parallel to the length of the plane of advance.

There are also furnaces without water-based cooling systems, in which, however, the processed material consists of pipes, therefore products much lighter than blooms or billets, and the heating and heat treatment are performed at much lower temperatures.

In these furnaces for pipes, given the lower heating requirements, burners are provided only above the so-called "pass line", since the pipes, being light and having a hollow circular section, are made to rotate as they advance, in such a way that the heating, at not particularly high temperatures, occurs uniformly over their entire surface.

On the contrary, given that billets or blooms are heavier products and have a square/rectangular/polygonal/full circular section, it is not possible to rotate them during movement, so the heating and heat treatment temperatures have to be much higher.

Examples of such furnaces mainly for pipes are described in documents GB 1473645, DE3339585 and WO 2012/052960.

In particular, document GB 1473645 describes a furnace for tempering steel pipes which has mobile longitudinal members shaped to accommodate the pipes which, as mentioned above, are rotated as they advance. The burners are present only on one upper wall of the furnace.

Document DE3339585 also concerns a furnace for heating pipes, special profiles and suchlike, in which the burners are provided on an upper wall of the furnace only in the heating chamber where the pipes are present, while further burners are provided in lateral chambers, distinct and separate from the heating chamber.

Document WO 2012/052960 describes a conveyor with mobile longitudinal members and a furnace for the heat treatment of metallurgical products that comprises said conveyor. This document does not consider and does not address the problem of heating these products, but only the problem of moving them.

In the treatment of pipes, the heating process occurs in a controlled manner, since the heating serves to obtain a change in the crystalline structure which determines the mechanical characteristics of the pipe itself.

On the contrary, in the heating of billets and blooms, the purpose is not to modify the crystalline structure, but only to heat the metal products in order to bring them to a suitable temperature for subsequent working.

In known furnaces, the metal products are disposed resting on the beams, transversely to the longitudinal development thereof.

The fixed beams are associated with a fixed support frame, while the mobile beams are associated with one or more mobile support frames in order to obtain the correct feed of the products.

The support frames, in particular the beams and the elements that support them, and a segment of the roller ways, since they are inside the heating chamber, are subject to severe thermal and mechanical stress due to the heating parameters required by the treatment of billets and blooms.

Generally, given the high temperatures that are reached inside the furnace, which can vary between about 600 and 1250° C., and due to the great weight of the metal products processed, in traditional heating furnaces for blooms and billets a water-based cooling system is required that ensures that the components inside the chamber maintain suitable mechanical characteristics and do not deform or deteriorate.

Such deformation and deterioration are particularly dangerous and harmful in consideration of the high mechanical loads that the support elements have to sustain, in consideration of the weights of blooms and billets, much higher, for example, than those of pipes.

On the other hand, the cooling of the components increases the removal of heat from inside the chamber, making it necessary for a greater input of thermal energy by the burners in order to reach the required temperatures. The increase in thermal energy is directly correlated to higher fuel consumption, higher operating costs and higher emissions of gases, such as $CO_2$, $NO_X$ and others, into the atmosphere.

Document EP 2 678 458 describes an alloy particularly suitable for use in the construction of furnaces, in particular in furnaces in which there is no real movement of the products, and the heating process occurs in a discontinuous manner. In such furnaces the mechanical stresses on the structure due to the combination of weight and movement of the products and high temperatures are not present. Consequently, this material is not suitable for walking beam furnaces for heating steel products such as blooms or billets, moving inside the furnace.

Another problem correlated to the water-based cooling of these components is that the water causes a black line, known as a "skidmark", on the lower external surface of the billets and blooms, in correspondence with the cooled beams. To reduce this phenomenon, traditional walking beam furnaces use devices known as "riders" which reduce the problem, but do not eliminate it, and this becomes very critical especially for the subsequent rolling operations.

One of the advantages of traditional walking beam furnaces is that they have a limited length, thanks to the fact that much higher temperatures can be reached inside them, and therefore shorter residence times of the billets in the furnace. However, the high temperature is responsible for the big formation of scale on the surface of the billets themselves. The scale that forms, when removed, ends up among the waste products, which causes a loss of material which in turn entails a reduction in the weight of the semi-finished products, to the disadvantage of the performance, that is the yield of an operation for transforming or processing steel.

There is therefore a need to perfect an apparatus for heating steel products which can overcome at least one of the disadvantages of the state of the art.

In particular, one purpose of the present invention is to provide a heating apparatus that does not suffer from the disadvantages deriving from the use of a liquid-based cooling system.

Another purpose of the present invention is to provide a heating apparatus with a reduced environmental impact, especially in relation to the emissions of gas into the atmosphere.

Another purpose of the present invention is to provide a heating apparatus which has lower management and maintenance costs than traditional apparatuses.

Another purpose of the present invention is to provide an apparatus that has a particularly compact vertical development to simplify the civil works when first installed.

Another purpose of the present invention is to obtain a heated product having a uniform thermal gradient, without cold zones or points.

The Applicant has devised, tested and embodied the present invention to overcome the shortcomings of the state of the art and to obtain these and other purposes and advantages.

SUMMARY OF THE INVENTION

The present invention is set forth and characterized in the independent claim. The dependent claims describe other characteristics of the present invention or variants to the main inventive idea.

In accordance with the above purposes, an apparatus for heating steel products, such as blooms or billets, which overcomes the limits of the state of the art and eliminates the defects present therein, comprises:

a heating chamber which extends between an inlet and an outlet, inside of which there are defined, in succession, at least one inlet zone, an intermediate zone and an outlet zone, a plane of advance defined, inside the heating chamber, by the alternation of fixed support elements and mobile support elements disposed parallel to the development in length of the apparatus, and supported respectively by a plurality of fixed bearing elements and mobile bearing elements, means for feeding and extracting the metal products, provided with respective feed and extraction rollers respectively associated with the inlet and outlet ends, heating and/or combustion members, for example burners, disposed both above and also below the plane of advance.

According to a first aspect, the fixed and mobile support elements, the fixed and mobile bearing elements and the feed and extraction rollers are made of a metal superalloy comprising at least a combined percentage of nickel and cobalt comprised between about 30% and about 60%, and chromium between about 24% and about 35%.

Thanks to the particular metal superalloy used to make the fixed and mobile support elements, the fixed and mobile bearing elements and the feed and extraction rollers, the liquid-based cooling thereof is not necessary, something that is always required in traditional furnaces for heating blooms or billets.

The apparatus according to the present invention, therefore, is without liquid-based, in particular water-based, cooling systems inside the heating chamber.

In another preferential solution, the metal superalloy comprises nickel between about 40% and about 50%, chromium between about 25% and about 35%, and cobalt in combination with one or more further elements at 10% maximum, wherein the superalloy also comprises a combination of further components between 5% and 50%.

According to another aspect, the fixed and mobile support elements, the fixed and mobile bearing elements and the feed and extraction rollers are respectively made with different metal superalloys, according to the zones of the heating chamber in which they are located and to the resulting different operating temperatures present there. In this case, the different metal superalloys used have at least a nickel and chromium content that increases from the inlet zone to the outlet zone.

According to another aspect, the fixed and mobile support elements, the fixed and mobile bearing elements and the feed rollers present at least in the inlet zone are made of a first metal superalloy.

The fixed and mobile support elements and the fixed and mobile bearing elements present in the intermediate zone are made of a second metal superalloy, different from the first.

The fixed and mobile support elements, the fixed and mobile bearing elements and the extraction rollers present in the outlet zone are made of a third metal superalloy, different from the first and second.

All three metal superalloys, first, second and third, are characterized by comprising a quantity of nickel and chromium, at least for 50% and up to 90% of their composition.

The first metal superalloy has an overall content of nickel and chromium lower than that of the second metal superalloy, and the second metal superalloy has an overall content of nickel and chromium lower than that of the third metal superalloy.

As mentioned, this solution allows to completely eliminate traditional water-based cooling, since the metal superalloys used allow the structural components inside the heating chamber to withstand the temperature without requiring liquid-based cooling systems, guaranteeing at the same time the structural resistance required.

In this way, the overall efficiency of the apparatus is increased and the corresponding emissions into the atmosphere are reduced. The quality and uniformity of the heated products is also better, since contact with the support elements does not cause traces or residues due to the temperature differences between the reciprocal surfaces.

The differentiation of the materials according to the different zones of the heating chamber allows to optimize the performances of the components under load, finding a compromise between investment costs and thermal resistance required. In fact, different zones have corresponding different operating temperatures which, combined with the weight of the metal products, require that all the support and movement elements have determinate thermal-mechanical sealing characteristics.

According to another aspect, the mobile bearing elements are made through, through a bottom wall of the heating chamber and are fixed to a single support frame disposed below the bottom wall and associated with movement means. Advantageously, the presence of a single support frame limits the spaces required for its movement, thus allowing to obtain a more compact apparatus.

According to another aspect, the apparatus comprises a lateral inlet aperture and a lateral outlet aperture, both of which are associated with a respective closing unit provided with a door and with a corresponding movement mechanism, advantageously of the pantograph type.

According to another aspect, the closing unit as above comprises a plurality of inert gas delivery devices associated with the inlet and outlet apertures, in order to create a gas barrier which prevents the atmosphere of the heating chamber from being contaminated with the external air, limiting the entry of oxygen from the outside and therefore the production of flakes, and which also prevents harmful gases, such as for example CO and NOR, from escaping from the furnace.

According to another aspect, the feed and extraction rollers are disposed inside the heating chamber, made through in, and cantilevered from, a respective front and rear end wall of the heating chamber. The feed and extraction means comprise a plurality of further inert gas delivery devices configured to produce an aeraulic seal for the feed and extraction rollers. These precautions, by limiting the entry of oxygen into the furnace, allow to reduce the production of flakes and the escape of harmful gases from the furnace.

According to one aspect, the apparatus comprises inside the chamber, in correspondence with the inlet and outlet, respectively a loading device and an unloading device to position the steel products from the feed rollers on the plane of advance, and from the plane of advance on the extraction rollers.

BRIEF DESCRIPTION OF THE DRAWINGS

These and other aspects, characteristics and advantages of the present invention will become apparent from the following description of some embodiments, given as a non-restrictive example with reference to the attached drawings wherein:

FIG. 4 is a front view of the closing unit;

FIG. 5 is a lateral view of FIG. 4;

FIG. 6 is a schematic view of the feed or extraction means;

Figure 1:
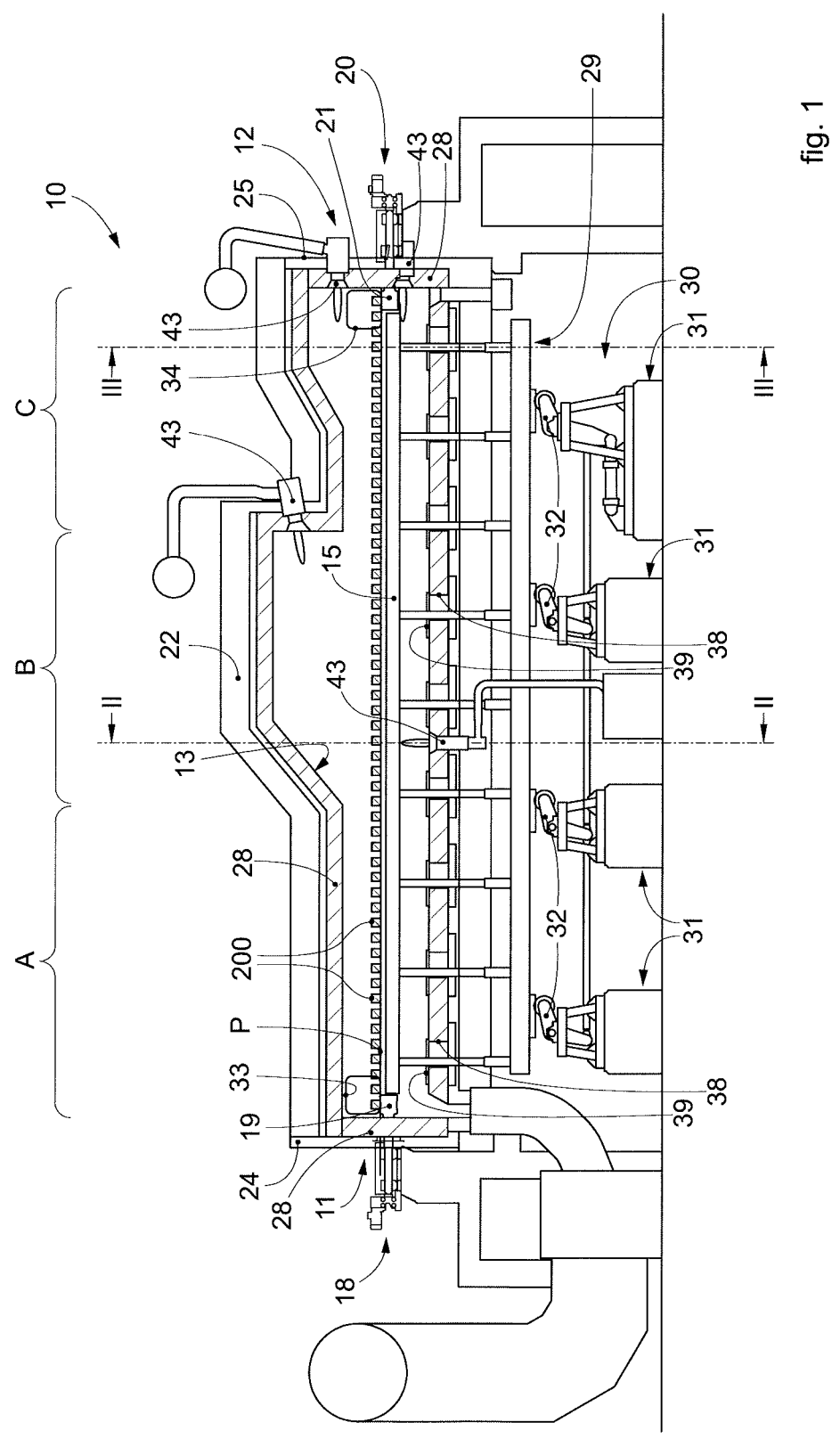
FIG. 1 is a schematic lateral view of an apparatus for heating steel products in accordance with some embodiments described here.

To facilitate comprehension, the same reference numbers have been used, where possible, to identify identical common elements in the drawings. It is understood that elements and characteristics of one embodiment can be conveniently combined or incorporated into other embodiments without further clarifications.

DETAILED DESCRIPTION OF SOME EMBODIMENTS

We will now refer in detail to the possible embodiments of the invention, of which one or more examples are shown in the attached drawings, by way of a non-limiting illustration. The phraseology and terminology used here is also for the purposes of providing non-limiting examples.

FIG. 1 shows an apparatus 10 for heating steel products 200 which can be casting semi-products, typically steel blooms or billets.

The steel products 200 in question have a solid cross-section with a square, rectangular, polygonal, circular shape. Furthermore, each steel product 200 can have a weight comprised between about 0.5 ton and about 5 ton, preferably between about 0.5 and about 2.5 ton.

Hereafter, for the sake of simplicity, we will refer, by way of example only, to billets 200.

The apparatus 10 is a furnace with fixed and mobile bars or longitudinal members, also known as a walking beam furnace.

The furnace 10 comprises a heating chamber 13 which extends between an inlet 11 and an outlet 12 of the furnace 10, FIG. 1. Inside the heating chamber 13 there are defined, in order, an inlet or recovery zone A, an intermediate or pre-heating zone B, and an outlet or heating and equalization zone C, which are characterized by different operating temperatures.

The inlet zone A can be characterized by a maximum temperature of about 1000° C., the intermediate zone B by a maximum temperature of about 1100° C. and the outlet zone C by a maximum temperature of about 1150° C.

Figure 2:
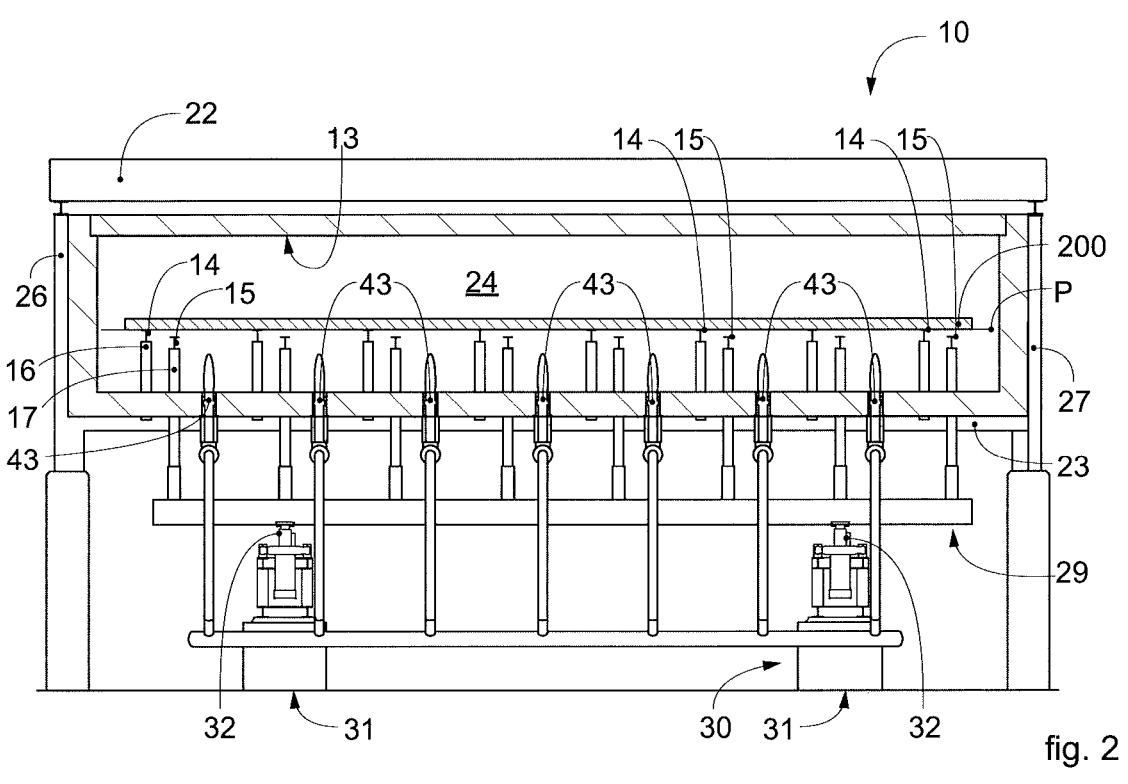
FIG. 2 is a section along line II-II of FIG. 1.
Figure 3:
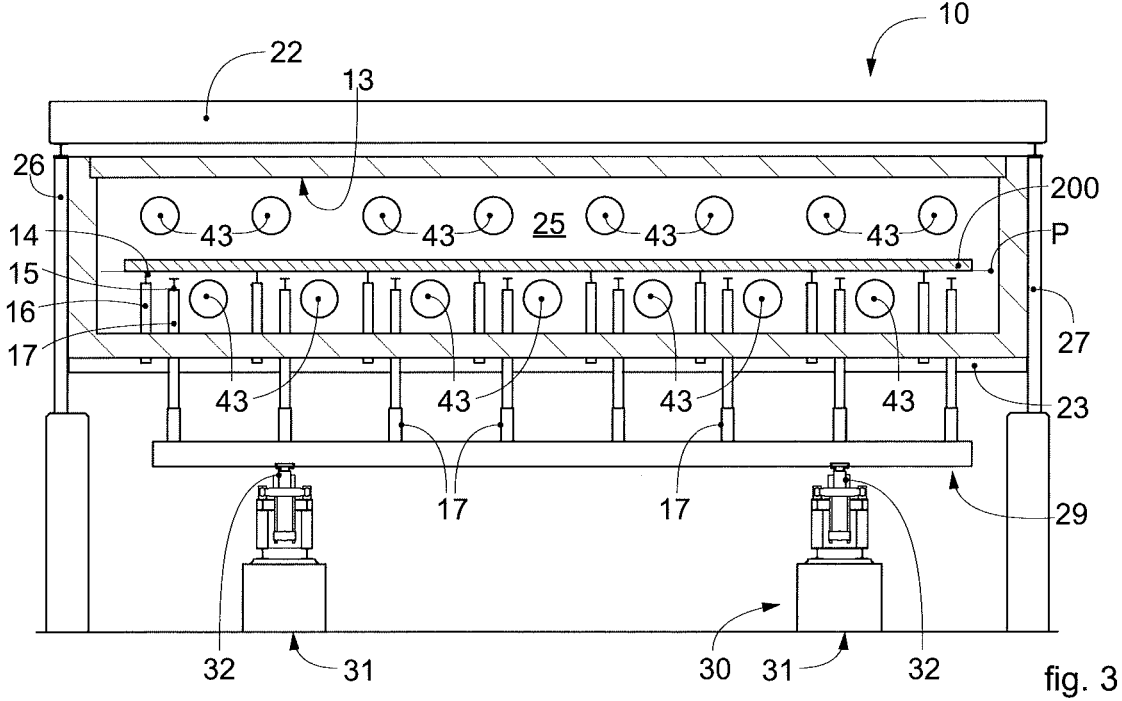
FIG. 3 is a section along line III-III of FIG. 1.

With particular reference to FIGS. 2-3, inside the heating chamber 13 there is a plane of advance P defined by the alternation of fixed support elements 14 and mobile support elements 15, which are all disposed parallel to the development in length of the furnace 10.

The support elements 14 and 15 support the billets 200 and at the same time allow them to advance, stepwise, between the inlet 11 and the outlet 12.

The fixed support elements 14 and the mobile support elements 15 are supported, respectively, by fixed bearing elements 16 and by mobile bearing elements 17.

By way of example only, the fixed 14 and mobile 15 support elements can consist of beams, or longitudinal members, conformed as an "I", while the fixed 16 and mobile 17 bearing elements can consist of pipes with a circular section.

The fixed 14 and mobile 15 support elements have a respective rest surface for the billets 200 which is substantially flat, that is, without any shapings with a shape mating with the shape of the cross-section of the billets 200.

However, solutions in which this surface can have concavities are not excluded, in the event that the steel products have, for example, a circular cross-section.

The furnace 10 comprises feed means 18 associated with the inlet 11 and provided with feed rollers 19, and extraction means 20 associated with the outlet 12 and provided with extraction rollers 21, in order to move each billet 200, respectively, inside and outside the heating chamber 13.

According to one aspect, the fixed and mobile support elements 14, 15, the fixed and mobile bearing elements 16, 17 and the feed and extraction rollers 19, 21 are made of a metal superalloy comprising at least a combination of nickel and cobalt between about 30% and about 60% and chromium between about 24% and about 35%.

The superalloy also comprises a combination of further chemical components, or elements, between about 5% and about 50%.

This combination of further chemical components can favorably be a function of the position in which the fixed and mobile support elements 14, 15, the fixed and mobile bearing elements 16, 17 and the feed and extraction rollers 19, 21 are disposed inside the furnace 10. In another preferential solution, the metal superalloy comprises nickel between about 40% and about 50%, chromium between about 25% and about 35%, and cobalt in combination with one or more further elements at 10% maximum. In this case, the superalloy comprises a combination of further components between 5% and 35%.

In another evolution of the present invention, the fixed and mobile support elements 14, 15, the fixed and mobile bearing elements 16, 17 and the feed and extraction rollers 19, 21 are made with different metal superalloys according to the zones of the apparatus 10 in which they are located. In this case, the metal superalloys have a content at least of nickel and chromium that increases from the inlet zone A to the outlet zone C.

According to one embodiment, the fixed and mobile support elements 14, 15, the fixed and mobile bearing elements 16, 17 and the feed rollers 19 present in the inlet zone A are made of a first metal superalloy M1.

The fixed and mobile support elements 14, 15, the fixed and mobile bearing elements 16, 17 present in the intermediate zone B are made of a second metal superalloy M2.

The fixed and mobile support elements 14, 15, the fixed and mobile bearing elements 16, 17 and the extraction rollers 21 present in the outlet zone C are made of a third metal superalloy M3.

The metal superalloys M1, M2 and M3 comprise, as main components, nickel and chromium, at least for 70% and up to 90% of their composition. In this case, the superalloy comprises a combination of further components between 10% and 30%.

The further chemical components that complete the chemical composition of the superalloy can be comprised amongst aluminum, iron, tantalum, zirconium, vanadium, magnesium, calcium, carbon, boron, phosphorus, molybdenum, tungsten. Other components can be, but are not limited to, titanium, silicon, niobium, manganese, cobalt.

The first metal superalloy M1 has an overall content of nickel and chromium lower than that of the second metal superalloy M2, and the second metal superalloy M2 has a nickel and chromium content lower than that of the third metal superalloy M3.

Making the components present inside the heating chamber with the metal superalloys M1, M2, M3 allows to greatly simplify the layout of the furnace 10 since, in this case, a liquid-based cooling system to cool the components is not necessary. Furthermore, the absence of cooling allows to maintain a more homogeneous temperature of the chamber, with direct consequences both on the quality of the heated products, on fuel consumption as well as on emissions of gas into the atmosphere.

Furthermore, the absence of liquid-based cooling eliminates the problem of skidmarks, since the zones where the billets 200 rest on each occasion are at the same temperature as the latter.

The metal superalloys M1, M2, M3 are particularly resistant to the loads imposed at high temperatures. This is particularly required in the field of heating billets 200, which are particularly heavy and, due to their structure, require high heating temperatures and/or long residence times inside the heating chamber 13.

According to some embodiments, the first metal superalloy M1 comprises Ni+Co at 30-40%, Cr at 24-30%, W+Nb+Ti at 1-5% and C+Si+Mn at 1-4%. In this case, the superalloy comprises a combination of further components between 21% and 44%.

The second metal superalloy M2 comprises Ni 40-50%, Cr 25-35%, W+Co at 10% maximum, C at 1% maximum, Si+Al at 3% maximum and Mn at 3% maximum. In this case, the superalloy comprises a combination of further components at 35% maximum.

The third metal superalloy M3 comprises Ni+Co at 45-60%, Cr at 25-35%, W at 8-16% and C+Si+Al at 1-4%. In this case, the superalloy comprises a combination of further components at 21% maximum.

This differentiation in the composition of the superalloys allows to adapt the thermal-mechanical characteristics of the materials according to the temperatures present in the different zones of the heating chamber 13, while simultaneously considering the economic aspect. In fact, the solution of the present invention optimizes the compromise between thermal resistance and efficiency of the materials used, with respect to tooling and maintenance costs, given the increasing cost of superalloys as their thermal resistance characteristics increase. The materials thus defined also support the high weight of the billets 200, which becomes even more significant if exerted on the support components at high temperatures.

According to some embodiments, a feed path for the billets 200 is defined inside the chamber 13, which develops rectilinearly on the plane of advance P between the inlet 11 and the outlet 12, in correspondence with which the billets 200 respectively enter and exit the furnace 10.

The heating chamber 13 is delimited by an upper wall 22 and by an opposite bottom wall 23, by a first and a second end wall 24 and 25, and by two lateral walls 26, 27 substantially parallel to each other.

The walls as above can be covered with plates of refractory material 28 in order to limit heat losses toward the outside, FIG. 1.

The plane of advance P is horizontal and is located at an intermediate height between the upper wall 22 and the bottom wall 23. The plane of advance P is substantially parallel to the bottom wall 23 and has a slightly smaller extension than the extension of the latter.

According to some embodiments, the zones A, B and C can be defined by the geometry between the upper wall 22 and the bottom wall 23. In particular, the upper wall 22 can have segments more or less distanced from the bottom wall 23, defining zones that have a larger or smaller section for the passage of air.

The fixed bearing elements 16 are orthogonally fixed to the bottom wall 23 and are longitudinally aligned, in groups, in order to support a respective fixed support element 14.

The mobile bearing elements 17 are made through in the bottom wall 23, they are longitudinally aligned, in groups, in order to support a respective mobile support element 15 and are fixed to a single support frame 29 disposed below the bottom wall 23 and associated with movement means 30. The presence of a single support frame 29 allows to limit the volume of the technical compartment underneath the furnace 10, and therefore simplify and limit the costs of the building work required to build/install the furnace 10.

However, it is not excluded that the support frame 29 can be divided into two or more independent structures.

The bottom wall 23 has, for each mobile bearing element 17, an aperture 38 having a longitudinal development coherent with the advance-retraction step imposed. Each aperture 38 can be sealed by means of a through sealing element 39 which cooperates with an internal surface and with an opposite external surface of the bottom wall 23.

The movement means 30 are configured to allow a combined movement of advance-lifting and lowering-retracting of the support frame 29.

With particular reference to FIGS. 1-3, the movement means 30 comprise two groups, or rows, each consisting of four aligned movement units 31 disposed resting on the installation plane of the furnace 10 and disposed below the support frame 29, which rests on them.

Each movement unit 31 can comprise a connection rod 32 which can be selectively driven to move the support frame 29.

The movement units 31 can be driven independently or, as in the case described here, one movement unit 31 of each group can be driving and synchronously guide the movement of all the others.

Therefore, some movement units 31 are associated with respective electromechanical devices to move the connection rods 32, the electromechanical devices being driven by a hydraulic or electric cylinder.

The furnace 10 comprises an inlet aperture 33 disposed in correspondence with the inlet end 11, more preferably in correspondence with the lateral wall 26 or 27, and an outlet aperture 34 disposed in correspondence with the outlet end 12, the outlet aperture 34 also being more preferably disposed in correspondence with the lateral wall 26 or 27.

Respective closing units 35 are associated with the inlet aperture 33 and with the outlet aperture 34.

Each closing unit 35 comprises a door 36 and a pantograph-type mechanism 37 for moving the door 36.

The closing unit 35 can comprise a plurality of devices 42 to deliver inert gas, for example nitrogen, disposed around the perimeter of the aperture 34, 35 and configured to create a gas barrier which prevents the escape of hot air, together with gas such as CO, toward the outside of the furnace 10 and the entry of air from the outside. In this way, the risk of contamination for operators as well as environmental pollution are limited, and the formation of scale is also reduced.

According to some embodiments, the feed rollers 19 and the extraction rollers 21 are located inside the heating chamber 13 and are disposed respectively made through in, and cantilevered from, the front end wall 24 and the rear end wall 25 with respective axes of rotation parallel to the direction of advance of the billets 200 inside the furnace 10.

The rollers 19, 20 define a respective roller way disposed astride the aperture 33, 34 of the furnace 10.

The rollers 19, 20 are supported by rotation shafts 41 driven individually or in groups by one or more drive devices 40.

The portion of each rotation shaft 41 outside the heating chamber 13 is protected by a metal box 42 which extends up to the flange for connection with the wall 24, 25 of the furnace 10.

The feed means 18 and the extraction means 20 comprise a plurality of further devices 44 to deliver inert gas, for example nitrogen, configured to deliver the gas inside the metal box 42 in order to create a barrier that prevents the escape of hot air toward the outside of the furnace 10 and the entry of air from the outside which could contaminate the atmosphere of the heating chamber 13 and also increase the quantity of scale that forms on the surface of the billets.

The combination of the particular materials chosen to make the internal components of the furnace and the nitrogen seals described above allow to greatly reduce the consumption of the furnace 10, the emissions of polluting gases such as $CO_2$ and $NO_x$ and the operating costs, and also determine an increase of its efficiency.

According to possible embodiments, the furnace 10 can comprise inside the chamber 13, in correspondence with the inlet 11 and the outlet 12, respectively a loading device and an unloading device to position the billets 200 from the feed rollers 19 on the plane of advance P, and from the plane of advance P on the extraction rollers 21.

In particular, the loading device is configured to remove the billet 200 from the internal feed rollers 19 depositing it on the first support elements 14, 15, while the unloading device is configured to remove the billet 200 from the last position in the furnace 10 depositing it on the internal extraction rollers 21.

With the loading and unloading devices there can be associated respective inert gas delivery devices to create an aeraulic seal in correspondence with slits provided on the walls of the furnace 10 for the entry of the gripping and movement elements of such devices.

The furnace 10 comprises, inside the heating chamber 13, a plurality of heating and/or combustion members, or burners, 43 distributed between the different zones. The burners 43 are connected to a source of fuel, for example methane, and to a source of comburent that preferably contains oxygen, such as for example air, by means of suitable fuel supply means and comburent supply means, for example pipes.

According to some embodiments, the control and regulation of the supply of comburent and fuel inside the chamber 13 can be operated in such a way that the comburent is in a sub-stoichiometric or stoichiometric proportion with respect to the fuel, as described in the patent application in Italy 102020000013285 in the name of the same Applicants.

The burners 43 are organized into groups, wherein each group comprises a plurality of burners 43 aligned transversely with respect to the longitudinal development of the furnace 10.

The burners 43 are associated with the upper wall 22, with the rear end wall 25 and possibly with the bottom wall 23.

The burners 43 are disposed both above and also below the plane of advance P. This disposition of the burners 43 allows to limit the length of the furnace 10 and obtain a uniform heating of the billets 200 which, as stated, are not rotated around their own axis during the movement due to their weight.

However, other dispositions are possible.

With particular reference to FIGS. 1-3, a first group of burners 43 is associated with the bottom wall 23 of the intermediate zone B, a second group of burners 43 is associated with the upper wall 22, again in the intermediate zone B, and two further groups are disposed on the rear end wall 25, parallel and astride the plane of advance P in the outlet zone C.

The furnace 10 of the present invention therefore has free lateral walls 26, 27, that is, not equipped with burners 43.

Figures 7, 8, 9:
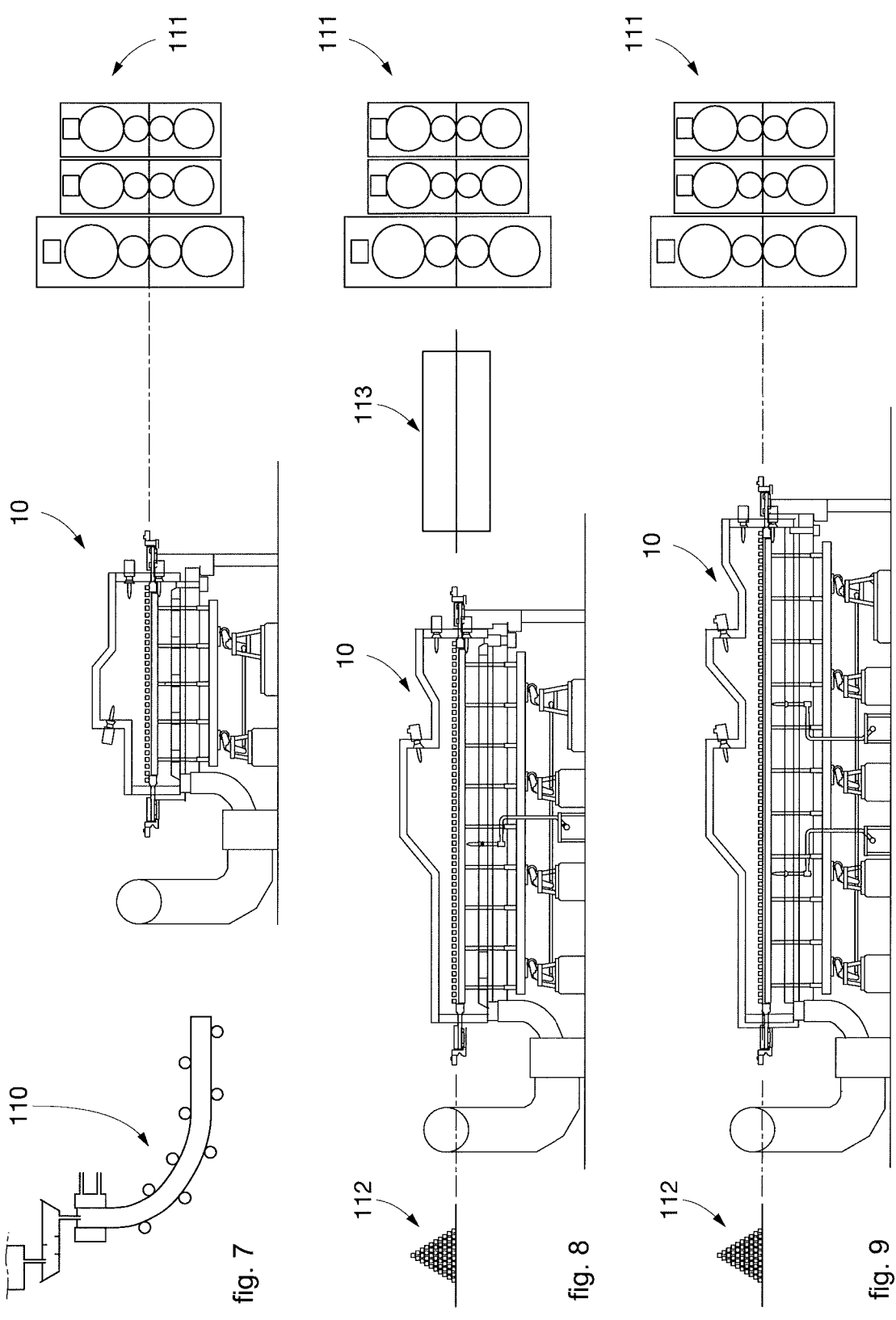
FIGS. 7-9 are schematic lateral views of a plant for producing steel products that comprises the heating apparatus of FIGS. 1-6.

According to some embodiments, shown in FIGS. 7-9, the furnace 10 is inserted inside a plant 100 for producing steel products.

The plant 100 can be provided in different configurations, depending on requirements and on the type of energy—gas, electricity—available and/or more convenient in the country of installation.

In a first configuration, shown in FIG. 7, the plant 100 comprises, in the following order, a casting line 110, a furnace 10 and a rolling line 111. In this case, the furnace 10 receives the billets 200 directly from the continuous casting line at a temperature of about 850° C. and heats them up to a temperature of about 1050° C. so that they can have a start rolling temperature of about 950° C.-1000° C. This allows to size the furnace 10 with a limited length, given that the entry temperature is already high, and to reduce the number of burners 43 which in this case are present only on the upper wall 22 of the intermediate zone B and in the outlet zone C.

This application is an alternative to using an induction furnace, and it is used when there is a need for a thrust equalization of the billet 200, for example, made of carbon steel, with a reduced thermal interval between the surface and the core. Furthermore, the furnace 10 allows to have a buffer in case of interruption of the downstream rolling process due to accidents or change of cylinders.

In a second configuration, shown in FIG. 8, the plant 100 comprises a store of semi-finished products 112 where the billets 200 are at an ambient temperature of about 20° C. The furnace 10 located downstream is followed by an induction furnace 113 and by a rolling line 111. In this case, the furnace 10 is sized in order to bring the billets 200 from an entry temperature of about 20° up to an exit temperature of about 850° C.-950° C. In this way, the formation of scale, which begins to form at around 750° C., is greatly reduced, and gas consumption and therefore emissions are greatly reduced.

The induction furnace 113 heats the billets 200 up to a start rolling temperature of about 1150° C.-1250° C. The furnace 10 of the second configuration of the plant 100 is the one already described with reference to FIGS. 1-3.

In a third configuration, shown in FIG. 9, the plant 100 comprises a store of semi-finished products 112 where billets 200 are at an ambient temperature of about 20° C. The furnace 10 located downstream is sized in order to bring the billets 200 from an entry temperature of about 20° up to an exit temperature of about 1050° C. so that they can have a start rolling temperature of about 950° C.-1000° C. at entry to the rolling line 111. The furnace 10 of the third configuration of the plant 100 has a greater length than the furnaces 100 of the previous solutions and has a more extended heating zone B, provided with a greater number of burners 43, both on the bottom wall 23 and also on the upper wall 22.

Figure 10:
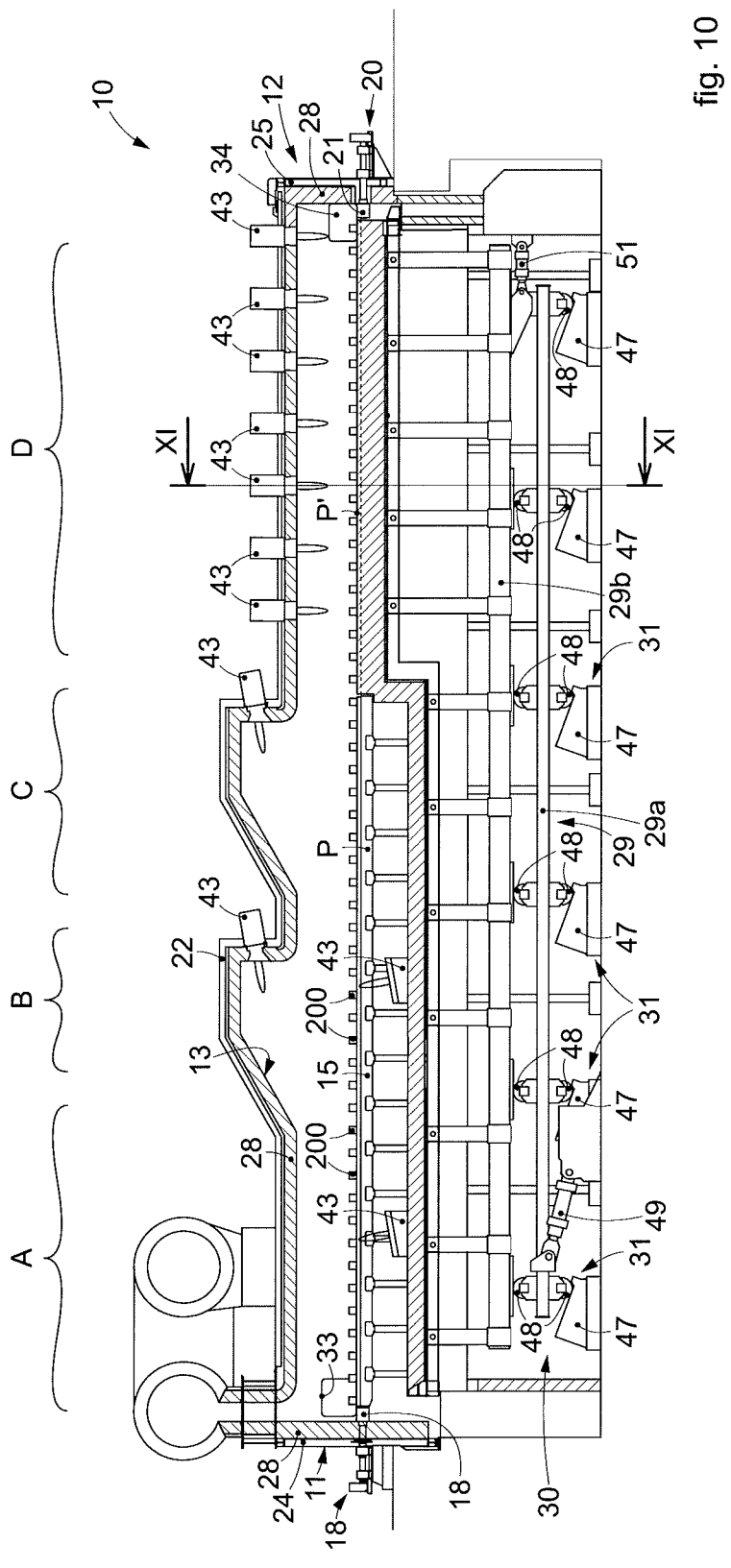
FIG. 10 is a variant of an apparatus for heating steel products in accordance with some embodiments described here.
Figure 11:
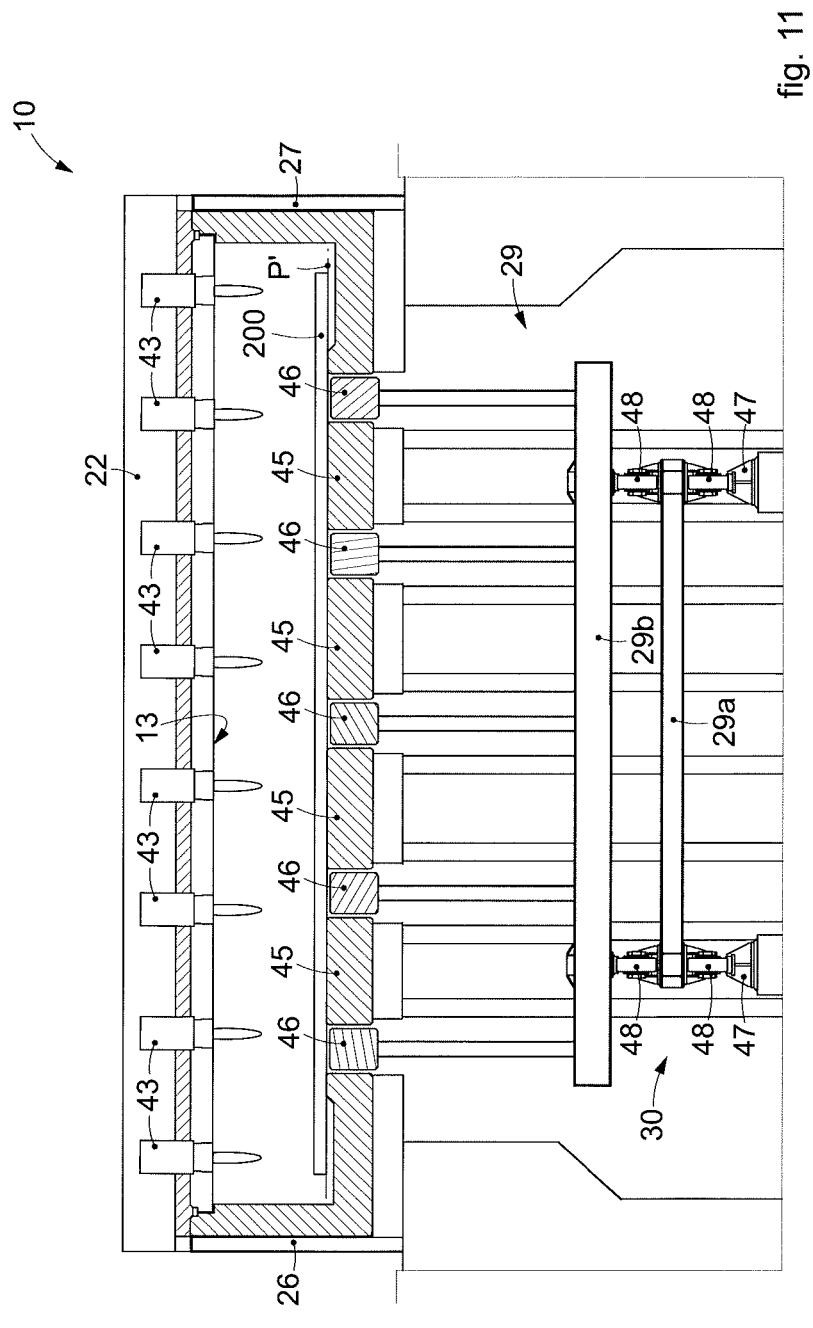
FIG. 11 is a section along line XI-XI of FIG. 10.

According to one variant shown in FIGS. 10-11, the furnace 10 comprises, inside the heating chamber 13, another plane of advance P' disposed downstream of the plane of advance P in the direction of advance of the billets 200.

The other plane of advance P' is of the mobile sole type so that the furnace 10 is of the walking beam type in a first sector, which comprises the inlet zone A, the intermediate zone B and the outlet zone C, which in this case becomes an intermediate outlet zone, and of the walking hearth type in a second sector where a final outlet zone D is defined. In this latter sector, higher heating temperatures are allowed compared to those provided in the first sector.

Both sectors are characterized by the absence of systems for cooling the elements that constitute the respective plane of advance P, P'.

Similarly to the plane of advance P, the other plane of advance P' is also defined by the alternation of further fixed support elements 45 and further mobile support elements 46, disposed parallel to the development in length of the furnace 10, FIG. 11.

The further fixed 45 and mobile 46 support elements can consist of respective refractory plates which overall define a substantially continuous plane.

The mobile support elements 46 are fixed, in a way that is known and substantially similar to what has already been previously described, to the same support frame 29 so that the movement of the billets 200 occurs in a homogeneous and coordinated manner between the first and second sectors.

In the embodiment of FIGS. 10-11, the support frame 29 comprises a lower frame, or lifting frame, 29a which allows the lifting movement, and an upper frame, or translation frame, 29b which allows the translation movement, of the mobile support elements 15, 46.

The upper frame 29b is resting slidingly on the lower frame 29a.

The lower frame 29a is moved in ascent/descent thanks to the movement means 30 which comprise one or more inclined planes 47, one or more rolling elements 48 pivoted to the lower frame and sliding on the inclined plane, and one or more pistons 49 fixed to the lower frame 29a and to fixed anchoring points.

The rolling elements 48 are disposed in pairs so that one of them is sliding on the inclined plane and the other is sliding in order to support the upper frame 29b.

The upper frame 29b is moved slidingly in horizontal translation on the lower frame 29a thanks to the movement means 30 which comprise one or more further pistons 51 fixed to the upper frame 29b and to fixed anchoring points.

It is clear that modifications and/or additions of parts may be made to the apparatus for heating steel products as described heretofore, without departing from the field and scope of the present invention as defined by the claims.

In the following claims, the sole purpose of the references in brackets is to facilitate reading: they must not be considered as restrictive factors with regard to the field of protection claimed in the specific claims.

The invention claimed is:

1. Apparatus for heating steel products, comprising:
   a heating chamber which extends between an inlet and an outlet, inside of which there are defined, in sequence, an inlet zone, an intermediate zone and an outlet zone,
   a plane of advance in said heating chamber defined by the alternation of fixed support elements and mobile support elements supported respectively by fixed bearing elements and mobile bearing elements,
   feed and extraction means provided with respective feed and extraction rollers respectively associated with said inlet and said outlet,
   heating and/or combustion members disposed both above and also below said plane of advance,
   the fixed and mobile support elements, the fixed and mobile bearing elements and the feed and extraction rollers are made of a metal superalloy comprising at least as main components, nickel and chromium, at least 70% and up to 90% of their composition, and a combination of further components between 10% and 30%, wherein the further components complete the chemical composition of the superalloy and are comprised amongst aluminum, iron, tantalum, zirconium, vanadium, magnesium, calcium, carbon, boron, phosphorus, molybdenum, tungsten, titanium, silicon, niobium, manganese, cobalt,
   wherein making said fixed and mobile support elements, said fixed and mobile bearing elements and said feed and extraction rollers with said superalloy allows to not have liquid-based cooling means inside said heating chamber,
   wherein the fixed and mobile support elements, the fixed and mobile bearing elements and the feed rollers present in said inlet zone are made of a first metal superalloy, the fixed and mobile support elements and the fixed and mobile bearing elements present in said intermediate zone are made of a second metal superalloy, while the fixed and mobile support elements, the fixed and mobile bearing elements and the extraction rollers present in said outlet zone are made of a third metal superalloy, wherein said first metal superalloy has an overall content of nickel and chromium lower than that of the second metal superalloy and the second metal superalloy has a nickel and chromium content lower than that of the third metal superalloy.

2. Apparatus as in claim 1, wherein said metal superalloy comprises nickel between 40% and 50%, chromium between 25% and 35% and cobalt at 10% maximum.

3. Apparatus as in claim 1, wherein said mobile bearing elements are made, through a bottom wall of said heating chamber and are fixed to a single support frame disposed below said bottom wall and associated with movement means.

4. Apparatus as in claim 3, wherein said movement means comprise a plurality of movement units each provided with a connection rod conformed so as to allow the correct movement of said support frame, and electromechanical devices configured to move said connection rods directly or indirectly.

5. Apparatus as in claim 1, further comprising a lateral inlet aperture and a lateral outlet aperture both of which are associated with a respective closing unit provided with a door and with a mechanism for moving said door.

6. Apparatus as in claim 5, wherein said closing unit comprises a plurality of inert gas delivery devices associated with said inlet and outlet apertures and configured to create a gas barrier which prevents the atmosphere of said heating chamber from being contaminated with the external air, and which prevents harmful gases from escaping from the heating chamber itself.

7. Apparatus as in claim 1, wherein said feed and extraction rollers are disposed inside said heating chamber, made through, and cantilevered from, a respective front and rear end wall of said heating chamber, wherein said feed and extraction means comprise a plurality of further inert gas delivery devices configured to produce an aeraulic seal for said feed and extraction rollers.

8. Apparatus as in claim 1, further comprising inside said chamber, in correspondence with said inlet and outlet, respectively a loading device and an unloading device to position said steel products from said feed rollers on said plane of advance and from said plane of advance on said extraction rollers.

9. Apparatus as in claim 1, further comprising a further plane of advance disposed in said heating chamber downstream of said plane of advance in a direction of advance of said products defined by the alternation of further fixed support elements and of further mobile support elements consisting of respective refractory plates.

* * * * *